Figure 1:
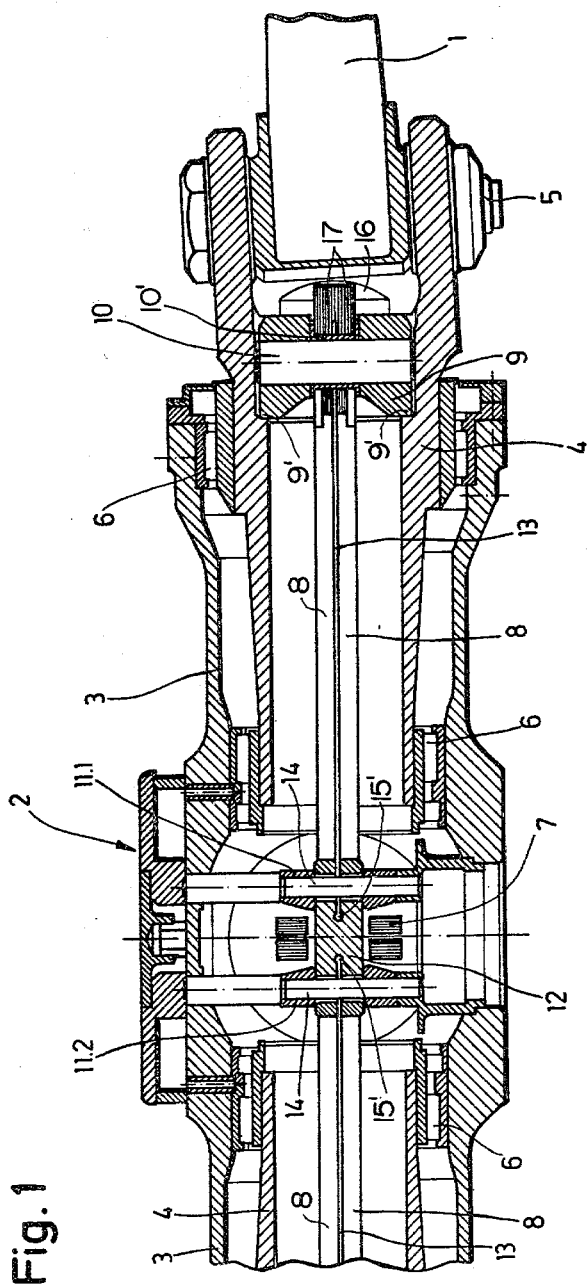

United States Patent [19]

Schwarz et al.

[11] 4,299,539
[45] Nov. 10, 1981

[54] FOUR-BLADE ROTOR, ESPECIALLY FOR HELICOPTERS

[75] Inventors: Alois Schwarz, Putzbrunn; Karlheinz Mautz, Ottobrunn; Michael Stephan, Munich, all of Fed. Rep. of Germany

[73] Assignee: Messerschmitt-Boelkow-Blohm Gesellschaft mit beschraenkter Haftung, Munich, Fed. Rep. of Germany

[21] Appl. No.: 962,303

[22] Filed: Nov. 20, 1978

[30] Foreign Application Priority Data

Nov. 30, 1977 [DE] Fed. Rep. of Germany ....... 2753305

[51] Int. Cl.³ .................................... B64C 27/48
[52] U.S. Cl. .................................. 416/138; 416/134 A
[58] Field of Search ................ 416/134 A, 138 A, 141

[56] References Cited

U.S. PATENT DOCUMENTS

| | | | |
|---|---|---|---|
| 3,470,962 | 10/1969 | Cure | 416/141 X |
| 3,578,877 | 5/1971 | Mautz | 416/134 A |
| 4,183,718 | 1/1980 | Mautz et al. | 416/138 X |

*Primary Examiner*—Everette A. Powell, Jr.
*Attorney, Agent, or Firm*—W. G. Fasse; D. F. Gould

[57] ABSTRACT

The present four-blade rotor is made up of two blade pairs, each blade pair having two rotor blades arranged diametrically opposite one another. The blades of each blade pair are coupled to each other by means of a coupling loop for taking up centrifugal forces produced by the rotation of the blades. The present rotor system also has a centering device including a centering body and tension straps for each coupling loop. The tension straps connect the respective loop end to the centering body whereby the two coupling loops may be centered in the rotor head practically without play and without substantially limiting the free movement of the coupling loops.

10 Claims, 2 Drawing Figures

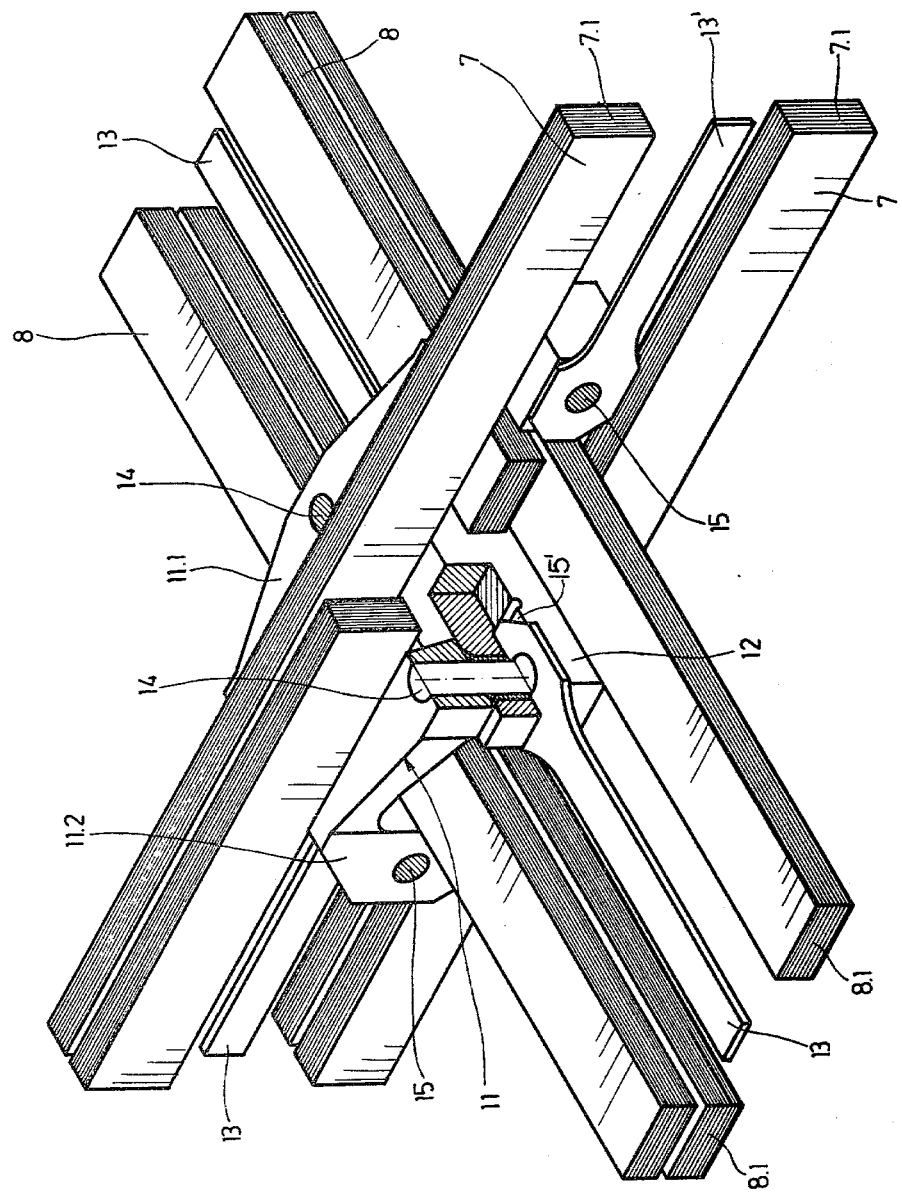

FOUR-BLADE ROTOR, ESPECIALLY FOR HELICOPTERS

BACKGROUND OF THE INVENTION

The present invention relates to four-blade rotors, especially for helicopters, wherein the four rotor blades are supported as blade pairs on a rotor head. Each blade pair comprises two rotor blades arranged diametrically opposite each other. The blade support is such that each blade may be adjusted in its blade pitch angle. The individual blades of a blade pair are held together by means of a tensionally strong, torsionally yielding connecting strap forming a tension loaded closed coupling loop. One coupling loop for one blade pair extends in a vertical plane. The other coupling loop for the other blade pair extends in a horizontal plane, whereby the horizontally extending coupling loop passes through the vertically extending coupling loop.

The German Pat. No. 1,531,359 which corresponds to U.S. Pat. No. 3,578,877 describes such a rotor, wherein the loop connecting the respective rotor blade pair passes freely through the rotor head center with a freedom of movement which ensures that the cyclic pitch adjustment or cyclic blade angle adjustment does not cause any twisting of the loop connecting the rotor blades of a blade pair. Both rotor blades of a pair arranged diametrically opposite each other are collectively tilted in the same direction and by the same amount for such blade angle adjustment. Thus, only the collective blade angle adjustment causes a torsional loading of the coupling loop since the loops pass freely through the rotor head. It has been shown in practice, however, that such a rotor system requires central support means for the rotor blade pairs at the rotor head, because of unbalances and vibrations in the axial direction of the rotor blades. Hence, a rotor system such as the one described above has not achieved any practical significance. Until now, the torsionally elastic loops connecting the blades of a blade pair were customarily formed by laminate bundles. A laminate bundle connects a respective rotor blade root to a central member arranged on the rotor head coaxially to the axis of rotation. A disadvantage of such an arrangement is that a twisting or rotary loading of the laminate blade bundle extending as far as the central member, cannot be avoided with each angular movement of the individual rotor blade. German Pat. No. 2,150,741 is an example of such a rotor system.

OBJECTS OF THE INVENTION

In view of the above, it is in the aim of the invention to achieve the following objects singly or in combination:

to provide a central securing means for the rotor blade pairs, or rather for the loops connecting the rotor blades in pairs;

to provide such a central securing or centering means without having to give up the free passage of the coupling loops through the rotor head center;

to maintain the advantage of a reduced torsional loading of the coupling loops of the rotor blade pairs;

to produce a central means having a high functional dependability and low costs;

to assure a centering of the coupling loops practically without play and without reducing the freedom of movement of these loops; and to produce a central securing means for the coupling loops which leaves these loops free of tension loads when the rotor does not rotate.

SUMMARY OF THE INVENTION

The rotor system of the present invention comprises a separate, rigid centering body for each coupling loop. Each centering body is connected to the ends of its respective loop by two torsionally yielding straps for each loop. These straps extend substantially coaxially with the respective longitudinal blade axis. This centering arrangement ensures that the coupling loop for each blade pair is maintained in a central position with respect to the rotor head center practically free of play and substantially without limiting the freedom of movement of the coupling loops. As a result of these measures, the static load portion of the centrifugal blade forces, taken up by the tension straps, may be chosen as desired by an appropriate choice of the length of the tension straps connecting the centering bodies to the coupling loops. Such an arrangement requires that the tension straps be unstressed when the rotor is at rest. In other words, the tension straps extend substantially without sagging in the rest position, that is without loading, because otherwise the straps would impair the respective coupling loop.

According to the invention the centering bodies 11, 12 for the coupling loops 7, 8 are arranged so that the horizontally extending coupling loop 8 passes freely through the centering body 11 for the vertically extending coupling loop 7. Further, the centering body 12 for the horizontally extending coupling loop 8 is operatively arranged to cooperate with the first mentioned centering body 11 in a force locking and/or form fitting manner. The centering body 12 for the horizontally extending loop 8 is located between the runs of the loop 8. The centering body 11 for the loop 7 has centering members located outside the vertical loop legs of the loop 7.

BRIEF FIGURE DESCRIPTION

In order that the invention may be clearly understood, it will now be described, by way of example, with reference to the accompanying drawings, wherein:

FIG. 1 illustrates a vertical sectional view through the rotor head of a four-blade helicopter rotor system along the rotational axis of the rotor head whereby only one rotor arm is completely shown; and FIG. 2 illustrates a perspective view, partially in section, of the rotor blade pair connecting loops at their cross-over area in the rotor head center; whereby the respective centering bodies are shown partially broken away.

DETAILED DESCRIPTION OF A PREFERRED EXAMPLE EMBODIMENT ILLUSTRATING THE BEST MODES OF THE PRESENT INVENTION

The four rotor blades 1 of a rotor system as illustrated in FIG. 1 are arranged in one plane. The rotor blades 1 may, for example, be made of fiber reinforced synthetic material. A rotor head 2 has four rotor arms to which the rotor blades are connected. The rotor head is secured by conventional means to a rotor shaft not shown. The rotor arms form blade angle bearing sleeves 3. A blade root sleeve 4 is supported in each blade angle bearing sleeve 3 by means of roller bearings 6, so that the blade root sleeve 4 is rotationally movable. The blade root of a rotor blade 1 extends into its respective blade root sleeve 4 and is secured in the sleeve 4 by means of bolts 5. The lead-lag bending moments and the flapping bending moments acting on the rotor blades are transmitted to the rotor head 2 through the blade root sleeves 4 and the roller bearings 6.

The individual rotor blades 1 of the rotor system of FIG. 1 are arranged in pairs. The rotor blade pairs comprise two rotor blades 1 arranged diametrically opposite each other. In order to take up the centrifugal forces effective on the rotor blades 1, the diametrically opposite rotor blades 1 of each rotor blade pair are interconnected at the blade root ends by respective coupling means. The connecting coupling means of each rotor blade pair are tensionally strong, yet torsionally yielding to permit the blade angle or pitch adjustment. Each of the blade pair connecting coupling means is formed by a stretched loop 7 or 8, which may, for example, be made of laminates combined in a bundle 7.1 or 8.1, whereby the loops are operatively connected to the respective blade root sleeves 4 by means of a bolt 10 supported by a so-called nut 9 in the respective sleeve 4.

FIG. 2 illustrates the laminate construction of the connecting loops 7 and 8. The connecting loops 7 and 8 each form a continuous or endless loop extending into each of the associated blade root sleeves of the respective blade pair. The respective loop bights of the coupling loops are formed in the region of the so-called nut 9 supporting the bolt 10. The nut 9 bears against shoulders 9' in the respective sleeve 4. The connecting loops 7 and 8 must cross each other at the rotor head center in a common plane because of the present arrangement of both rotor blade pairs. Consequently, as seen in FIGS. 1 and 2 one coupling loop 7 is arranged in a vertical plane and the other coupling loop 8, which extends through the loop 7, is arranged in a horizontal plane. The space between both loops 7, 8 and the cross sectional size of each loop are chosen so that the loops do not interfere in each others movements. This freedom of movement is assured for the collective pitch or blade angle adjustment as well as cyclic or sequential blade angle adjustment.

The laminates of the coupling loops 7 and 8 may be made of any suitable elastic material having sufficient strength characteristics for prolonged alternating stress. That is, in addition to the typically utilized spring steel, fiber reinforced synthetic materials may also be used. Such a choice of materials reduces costs without reducing the functional dependability of the coupling loop.

Each of the coupling loops 7, 8 is provided with centering means for maintaining a central position in the rotor head 2 which centering means take into account possible unbalances and vibrations in the axial direction of the rotor blades. The manner of maintaining this central positioning is such that the freedom of movement of the loops is substantially unrestricted. Hence, the advantage of a torsional loading of the coupling loops 7, 8 solely by the substantially static torsion loads resulting from angular movements of the rotor blades 1 during steering is maintained. For this purpose, a separate, rigid centering body 11, 12 is arranged for each loop 7, 8 at the rotor head center. Each loop end is connected to the corresponding centering body 11 or 12 by means of a tension strap 13, 13' extending coaxially with the longitudinal blade axis. The tension straps 13, 13' are torsionally yielding and may, for example, be made of the same material as the connecting loops 7, 8. The cross section of each tension strap 13, 13' proportionate to its length is so small, that the tension strap 13, 13' is extremely torsionally yielding compared to the torsional yielding ability of the coupling loops 7, 8.

As seen in FIG. 1, one end of each of the tension straps 13, 13' extends into the area of the corresponding loop end and around a bushing 10' which guides both the strap end and the loop end around the loop connecting bolts 10. Incidentally, the horizontally extending straps 13 for the horizontally extending loop 8 are connected at their radially inner ends to the centering body 11 of the vertically extending loop 7. The vertically extending straps 13' for the vertically extending loop 7 are connected at their radially inner ends to the centering body 11 of the vertically extending loop 7.

FIG. 2 best illustrates the manner in which the radially inner ends of each of the tension straps 13 are connected to the rotor head center, where free passage of the loops 7, 8 must be assured. This connection is accomplished in two ways. First, the horizontally arranged loop 8 and the respective centering body 12 extend through the centering body 11 for the vertically arranged connecting loop 7. Secondly, this centering body 12 has a force transmitting or form fit with the other centering body 11 and extends between the runs of the connecting loop 8. In other words, the centering body 12 extends substantially in the plane of its corresponding loop 8. The centering body 11, on the other hand, associated with the vertically arranged loop 7 comprises two halves 11.1 and 11.2 extending on both sides of the plane of the vertically arranged loop 7. This construction and arrangement of the centering bodies 11, 12 provides the additional advantage that the two centering bodies 11, 12 may be connected to each other and simultaneously to the rotor head by means of the two bolts 14 which also connects the tension straps 13 of the horizontally arranged loop 8 to the bodies 11, 12. The centering body 12 is provided with slots 15' for this purpose on two opposite sides thereof.

The tension straps 13' associated with the vertically arranged loops 7 are attached at the rotor head center by means of bolts 15. The bolts 15 serve simultaneously to connect the two halves 11.1, 11.2 of the centering body 11 of the vertically arranged connecting loop 7 to each other. One of the centering body halves 11.1 or 11.2 may even be eliminated if desired.

The centering means for maintaining a central positioning of the loops 7, 8 described above make sure that any unbalances occurring in the axial direction of the rotor blades load the respective one of the tension straps 13, thereby stretching the respective tension strap. As a result, a nearly perfect centering of the loops 7, 8 which is substantially free of play, is assured.

A protecting cup 16 covers the loop ends 17 of the coupling loop means 8 as the latter loop around the bushing 10' and thus around the connecting bolt 10.

Although the invention has been described with reference to specific example embodiments, it is to be understood, that it is intended to cover all modifications and equivalents within the scope of the appended claims.

What is claimed is:

1. A four-blade rotor structure, especially for helicopters, comprising rotor head means (2), four rotor blades arranged in pairs each pair defining a respective longitudinal axis, whereby the blades of a pair are located diametrically opposite each other, each blade having respective blade root means, blade angle bearing means operatively connecting the blade root means to said rotor head means, first vertical and second horizontal tension resistant and torsionally yielding endless coupling loop means operatively interconnecting the blade roots of a respective pair of blades, first stiff loop centering means (11) for said first, vertical endless coupling loop means (7) located in said rotor head means, second stiff loop centering means (12) for said second, horizontal endless coupling loop means (8), said second, stiff loop centering means (12) with said second, horizontal loop means (8) extending through said first, stiff loop centering means (11), said second, stiff loop centering means being further located between said second horizontal loop means (8) in said rotor head means, a first pair of tension strap means (13') operatively interconnecting the respective loop centering means (11) and the radially outer ends of the first, vertical coupling loop means (7), and a second pair of tension strap means (13) operatively interconnecting the second loop centering means (12) and the radially outer ends of the second horizontal coupling loop means (8), said first and second strap means (13', 13) being tension resistant and torsionally yielding, said structure further comprising means (14) operatively interconnecting said first and second loop centering means, said first and second tension strap means extending intermediate the respective loop means and substantially along the respective longitudinal blade axis.

2. The rotor structure of claim 1, wherein said first loop centering means (11) are parallel to the first coupling loop means (7) and bridges said second horizontal coupling loop means (8), said means for operatively interconnecting said first and second loop centering means providing a force transmitting connection between said first and second loop centering means.

3. The rotor structure of claim 1, wherein said interconnecting means for said first and second loop centering means comprise form locking means forming part of said first and second loop centering means.

4. The rotor structure of claim 1, wherein said first loop centering means (11) comprises two sections one of which extends along one side of the vertical coupling loop means (7) and the other of which extends along the opposite side of the vertical coupling loop means.

5. The rotor structure of claim 1, wherein said interconnecting means comprise bolt means (14) interconnecting the second pair of strap means (13) for the horizontal coupling loop means (8) to the first loop centering means (11) for the vertical coupling loop means (7) and to the rotor head means (2).

6. The rotor structure of claim 5, wherein said bolt means (14) interconnecting the second loop centering means (12) and the first loop centering means (11) also connect the first and second centering means to the rotor head (2).

7. The rotor structure of claim 1, further comprising bolt means (15) connecting said first pair of strap means (13') to said first loop centering means.

8. The rotor structure of claim 1, further comprising connecting means (9, 10, 9') for operatively securing the radially outer ends of said coupling loop means and the radially outer ends of the strap means to the respective blade angle bearing means (4).

9. The rotor structure of claim 1, wherein said first and second strap means have a given length substantially between said rotor head means and said blade root means, said strap means also having a cross-section dimension where the diagonal of the cross-section constitutes a fraction of said given length, said fraction being within the range of 1% to 10% of the given length of the strap means (13', 13).

10. The rotor structure of claim 1, wherein said first and second tension strap means extend coaxially to the respective longitudinal axis of the respective rotor blades.

* * * * *